United States Patent [19]
Belletete

[11] 3,877,996
[45] Apr. 15, 1975

[54] BATTERY HOT SHORT CONTROL METHOD AND MEANS

[75] Inventor: Laurence A. Belletete, Amesbury, Mass.

[73] Assignee: The United States of America as represented by the Secretary of the Navy, Washington, D.C.

[22] Filed: May 9, 1973

[21] Appl. No.: 358,750

[52] U.S. Cl. ............... 136/160; 136/161; 136/162; 136/174; 136/179
[51] Int. Cl. ......................................... H01m 45/02
[58] Field of Search .......... 136/160, 161, 162, 163, 136/180, 174, 179; 169/1 A, 2 R, 2 A

[56] References Cited
UNITED STATES PATENTS
1,967,800  7/1934  Woodbridge .................. 136/162 X
3,249,132  5/1966  Eberle ............................ 136/162 X

*Primary Examiner*—Winston A. Douglas
*Assistant Examiner*—John F. Niebling
*Attorney, Agent, or Firm*—R. S. Sciascia; C. E. Vautrain, Jr.

[57] ABSTRACT

A device for immediately controlling a high capacity battery cell which has developed an internal short circuit is provided. A control gun is inserted into the shorted battery, the gun having coaxial lines the outer of which is connected to a water supply and the inner to a suction. Water is continually added to the damaged cell, with the overflow continually drawn off thereby effectively reducing the heat generated by the short.

2 Claims, 6 Drawing Figures

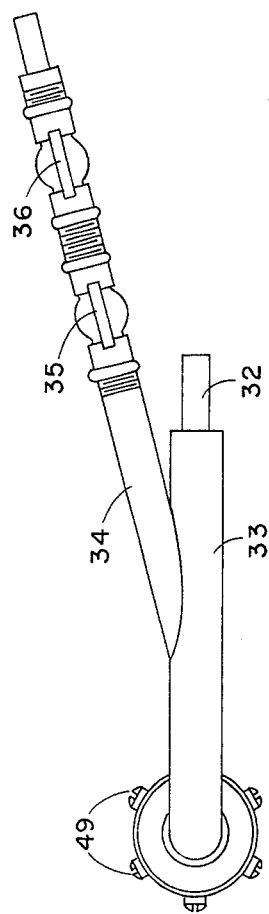
Fig. 2
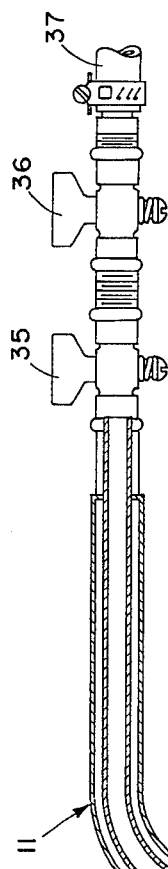
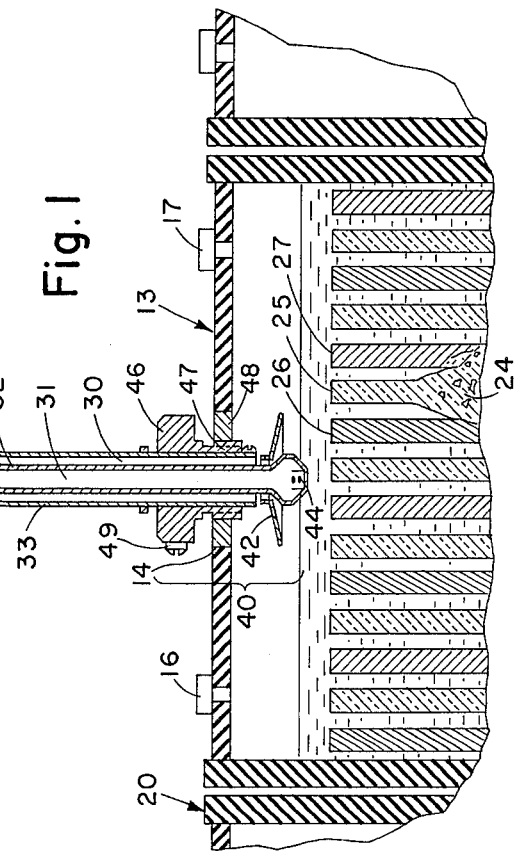
Fig. 1
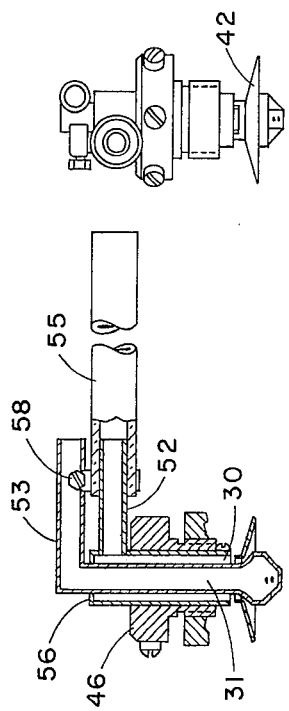
Fig. 3
Fig. 4

BATTERY HOT SHORT CONTROL METHOD AND MEANS

This invention concerns battery cells and, more particularly, a method of and means for reducing the damage resulting from an internal short circuit in a storage battery.

A short circuit in a storage battery or cell is costly and dangerous due to loss of the initial cell and the gases generated as well as from damage to other cells caused by heat transfer from the first cell. In submarines, especially non-nuclear powered ones which rely upon batteries for their electric current while cruising submerged, a short circuit in one cell is immediately critical. If not controlled quickly and effectively, the gases and heat generated by the short circuit can be quickly enlarged by the heat of one cell causing shorts in adjacent cells so that in a very short time the ship most certainly would become disabled.

In the past, no effort was made to prevent the burnable material inside a cell from melting and burning upon the occurrence of a short circuit in the cell. The electrolyte is boiled away by the short, exposing more separators and other material in the gas atmosphere. This cascading effect results in an increase in the magnitude of the short between the positive and negative plates of the affected cell, causing heat in the area of the hot short to exceed 1700°F. This heating condition is cumulative until all of the energy in the cell is consumed. While a short is active, large size cells can develop currents in excess of 200,000 amperes.

Existing systems for controlling a cell which has developed an internal short circuit involve discharging the cell as soon as possible and continuation of normal ventilation system line up and normal operation of the battery cooling system. In addition, personnel would stand by with a fire extinguisher to prevent spread of the fire. These methods are unsatisfactory since the higher discharge rates applied to the cell serve to increase the internal heat of the cell thereby aggravating the electrical fire. The present invention quickly and effectively reduces both the heat of the damaged cell and the discharge rate of that cell, alleviating the serious health and safety hazards attendant thereto.

According to the present invention, a high capacity battery cell which has developed an internal short circuit is neutralized by initiating a flow of water into the cell to a level above the burnable material, and concurrently removing excess liquid. Coaxial water supply and liquid evacuating lines are connected to a nozzle to form a control gun which is easily portable and kept in or adjacent to a battery compartment. The gun is inserted into the vent opening of the cell after a suction line has been attached to the central passage in the device and a water supply line has been attached to the fill passage of the device. After the gun is secured in the vent opening, the fill line is opened permitting water to enter the cell and cover the burning material and the suction line is opened to remove gases and excess liquid. Removal of the water and electrolyte mixture is thus effected substantially immediately at the level of the suction inlet of the gun. The fill and evacuation lines are kept functioning until the cell heat has been reduced to a safe level.

Accordingly, it is an object of the present invention to provide a method of and means for removing heat from a storage battery or cell.

It is another object of this invention to provide a system for removing cell heat which both submerges the burning material and removes gases and excess liquid from the cell.

A further object of this invention is to provide a system for controlling high internal shorts in a storage battery or cell which reduces the heat caused by the burning material and impedes the spread of damage to adjacent cells and other burnable material.

Other objects, advantages and novel features of the invention will become apparent from the following detailed description thereof when considered in conjunction with the accompanying drawings in which like numerals represent like parts throughout and wherein:

FIG. 1 is a side elevation, partly in section, of one embodiment of the control device shown inserted in a cell for operation;

FIG. 2 is a plan view of the control device only of the embodiment shown in FIG. 1;

FIG. 3 is a side elevation, partly in section, of an alternate embodiment of the invention;

FIG. 4 is an end view of the embodiment shown in FIG. 3;

Figure 6:
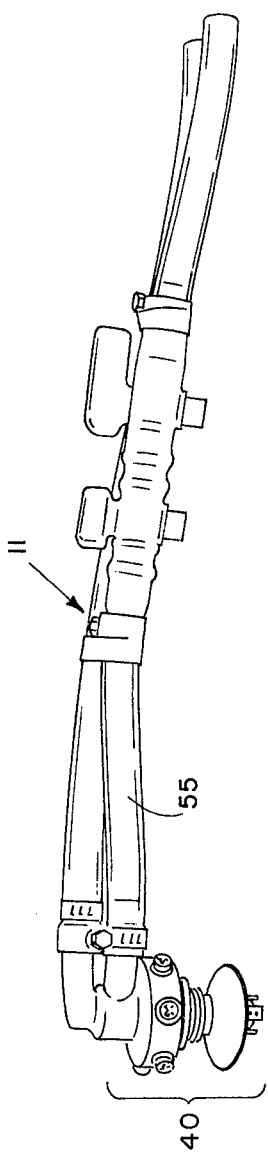
FIG. 6 is a perspective view of the embodiment of FIGS. 3 and 4.

Referring to FIGS. 1 and 2, a control gun 11 for alleviating the effects of shorts in a battery is shown connected for operation in a storage battery or cell 13. Gun 11 is inserted in the vent opening 14 in the cell which usually has a flash arrestor or dome disposed over it. Other cell fittings are a level indicator 16 and a service plug 17. Adjacent cells 20 and 21 illustrate the proximity of cells in a bank of cells as is used in submarines and also in commercial applications.

Cell 13 is shown with a defect therein inidicated at 24 which defect is in the nature of a breakdown of a battery plate separator 25 which is positioned between electrode plates 26 and 27. The breakdown of separator 25 permits a direct electrical connection between plates 26 and 27, which are of opposite polarity, thereby creating a short circuit through which excessive current flows and generates damaging heat and gases. Control gun 11 is provided with respective coaxial supply and evacuation passages 30 and 31, with inner passage 31 terminating in a nipple 32 and outer passage 30, formed by a tube 33, terminating in an extension 34 to which a pair of control valves 35 and 36 and a supply line 37 may be connected. Valve 36 preferably is an ON-OFF valve while valve 35 controls flow rate. Extension 34 is joined to tube 33 preferably by silver brazing. A pair of control valves may also be inserted in the suction line attached to nipple 32. The supply and suction lines terminate in a head 40 which includes a deflector 42 for diverting a portion of the water from outer passage 30 a substantial distance from the head. A strainer 44 covers the end of inner passage 31 which end is enlarged as indicated to both divert water outward along its upper surface and permit a greater area for gases and liquids to be drawn into the passage along its lower surface. Head 40 further includes a plug 46 having a threaded extension 47 which is secured to a protective cap 48 of cell 13 to seal the vent opening of the cell. Plug 46 is secured in place by set screws 49.

FIGS. 3 and 4 illustrate another embodiment of the invention wherein the suction and feed lines become coaxial substantially at the point of entry of the control gun into the cell. Supply passage 30 is connected to a tube 52 while suction passage 31 is connected to a tube 53 which in turn is connected to a vacuum source, not shown. The space between the supply and evacuation lines is closed above the juncture of tube 52 preferably by a bushing 56. A hose 55 is clamped to tube 52 by conventional means such as a hose clamp 58. In FIG. 4 deflector 42 is shown more clearly in side elevation as are the positions at which tubes 52 and 53 enter the head of the device.

Figure 5:
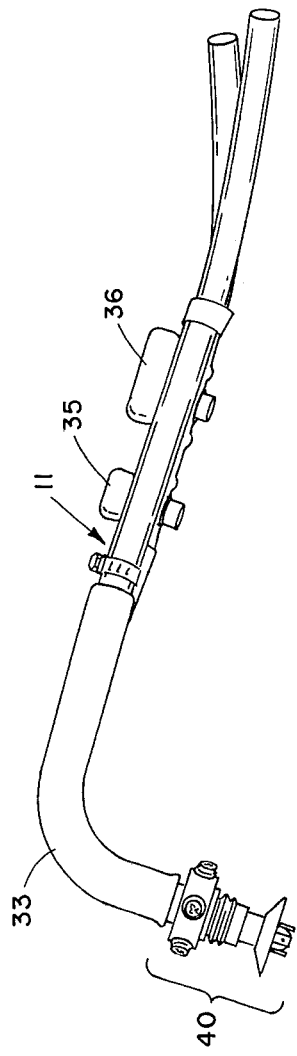
FIG. 5 is a perspective view of the embodiment of FIG. 1.

FIG. 5 is a perspective view of a control gun 11 in which the portion 33 is rigid as in the embodiment of FIGS. 1 and 2. FIG. 6 illustrates a control gun 11 whose fittings up to the head 40 of the device may be made of flexible material as permitted by the structure of the embodiment of FIGS. 3 and 4. The flexible gun of FIG. 6 is more suitable in instances where overhead space is limited or where it may otherwise be difficult to insert a rigid gun into a battery cell.

In operation, when an internal short which has developed in a cell is detected, the appropriate gun is inserted into the vent hole in the affected cell in the manner indicated in FIG. 1 after appropriate supply and evacuation lines have been connected to it. The plug 49 has a threaded extension which may be turned into threads 47 in cap 48 to provide a substantially sealed connection of the gun to the cell. Thereafter plug 46 is secured in place by tightening set screws 49. With the gun secured in position, the suction line is opened and then the supply line is opened and supply is regulated. As soon as the suction line is opened, gases are immediately withdrawn from the cell. When the supply line is opened, water enters the cell over a wide area and causes the level of electrolyte to gradually rise until it has reached the level of the end of the suction passage 31. At this point, the electrolyte and water mixture is evacuated at the rate which water is supplied to the cell so that the level of water-electrolyte is maintained the distance above the plates which is controlled by the position of head 40 of the control gun. The burnable material in the cell therefore is covered quickly by water supplied through passage 30 and is kept covered as long as the gun is maintained in operation. Head 40 of control gun 11 is provided with strainer 44 to preclude clogging by material from the cell. Since the effluent liquid is conductive so long as electrolyte is present in sufficient quantity, it is emptied into a suitable container, not shown, which must be isolated from electrical ground.

The invention thus presents a new principle for controlling high internal shorts which includes both removal of heat from a cell and dilution of the concentration of electrolyte in the cell, thereby increasing the resistance of the remaining electrolyte to current flow. Burnable material is submerged in liquid thereby reducing and arresting the burning of material which, if not submerged, would evolve toxic gases and dense smoke. The features of continuous flow and the maintenance of a filled condition in the cell also reduce the spread of separator breakdown and provide time to discharge the energy of the cell into an external load. A very important aspect of the invention is that by internally cooling the cell with water, the heat generated at the short is gradually reduced thereby reducing the chances of a hole being burned through the cell container. This feature provides protection for adjacent cells in the battery by impeding the spread of fire and heat to the adjacent cells and other burnable material which may be present outside the cell.

Obviously many modifications and variations of the present invention are possible in the light of the above teachings.

What is claimed is:

1. The method of controlling a high capacity battery cell which has developed an internal short comprising:
    flooding over the burnable material in said cell by introducing a non-electrolyte liquid into the cell;
    maintaining a continuous flow of said non-electrolyte to said cell at a rate sufficient to appreciably reduce the temperature of the electrolyte in said cell; and
    concurrently evacuating liquids from said cell at a rate which maintains a selected liquid level in said cell,
        said continuous supply to and removal of non-electrolyte operating to continuously dilute the electrolyte in said cell while constantly removing heat energy generated by said internal short until said short has been effectively controlled,
        said selected liquid level determined by the position of the orifice through which liquids are evacuated.

2. A device for rapidly cooling and controlling a high capacity battery cell which has developed an internal short circuit comprising:
    a unitary dual-passage fitting adapted to be received in close fit in an existing opening in the top of said cell;
    a pair of concentric passages in said fitting for continuously supplying liquids to said cell through the outer of said passages an concurrently evacuating gases and liquids from said cell through the inner of said passages;
    a supply of non-electrolyte liquid and means connecting said supply to the outer concentric passage;
    a reservoir adapted to contain electrolyte liquid and means connecting said reservoir to the inner concentric passage,
        the inner passage of said fitting terminating in an inverted head the upper surface of which is tapered to deflect supply liquid away from the fitting and the lower surface of which is provided with openings through which gases and liquids are drawn; and
    a deflector secured to and spaced from the conduit forming said inner passage intermediate said head and the end of the outer passage to further deflect supply liquid to areas of said cell remote from said fitting,
        said supply and said reservoir adapted to provide a continuous flow of non-electrolyte to and diluted electrolyte from said cell for a selected time interval after an initial filling to the level of the evacuating orifice of said fitting so that the gases and heat generated by said internal short are dissipated and said internal short is controlled,
        said control of said internal short precluding damage to adjacent cells of said battery.

* * * * *